United States Patent [19]

Danielli et al.

[11] Patent Number: 4,680,865
[45] Date of Patent: Jul. 21, 1987

[54] APPARATUS FOR CHECKING LINEAR DIMENSIONS

[75] Inventors: Franco Danielli, Zola Predosa; Sergio Solaroli, Bologna, both of Italy

[73] Assignee: Finike Italiana Marposs S.p.A., S. Marino di Bentivoglio, Italy

[21] Appl. No.: 836,416

[22] Filed: Mar. 5, 1986

[30] Foreign Application Priority Data

Apr. 1, 1985 [IT] Italy ................. 3386 A/85

[51] Int. Cl.⁴ .............................. G01B 7/28
[52] U.S. Cl. ................... 33/143 L; 33/504; 33/1 M; 33/549
[58] Field of Search ........... 33/504, 143 L, 147 N, 33/542, 549, 1 M, 147 M, 179.50

[56] References Cited

U.S. PATENT DOCUMENTS

| 3,137,942 | 6/1964 | Powers, Jr. et al. | 33/1 M |
|---|---|---|---|
| 3,562,918 | 2/1971 | Ertman et al. | 33/147 N |
| 3,594,909 | 7/1971 | Schultz | 33/143 L |
| 3,840,994 | 10/1974 | Izumi et al. | 33/504 |
| 4,170,067 | 10/1979 | Yohe et al. | 33/143 L |
| 4,305,207 | 12/1981 | Lantz | 33/504 |
| 4,353,556 | 10/1982 | Sterki | 33/179.5 D |
| 4,503,617 | 3/1985 | Chevrier et al. | 33/504 |
| 4,562,648 | 1/1986 | Danielli | 33/504 |

FOREIGN PATENT DOCUMENTS

| 1101777 | 11/1961 | Fed. Rep. of Germany . |
| 2804398 | 5/1979 | Fed. Rep. of Germany . |
| 3208412 | 12/1982 | Fed. Rep. of Germany . |
| 2099606 | 12/1982 | United Kingdom . |

Primary Examiner—Willis Little
Attorney, Agent, or Firm—Stevens, Davis, Miller & Mosher

[57] ABSTRACT

An apparatus for checking linear dimensions of mechanical parts comprises a bed, a longitudinal slide and two transverse slides arranged on the longitudinal slide and carrying relevant sensing elements adapted to touch the part to be checked. In order to obtain flexibility and quickness of operation, first and second reference rests for relevant parts are positioned on the bed and the transverse slides carry sensing elements having an arrangement substantially symmetrical with respect to a transverse symmetry plane. The apparatus is particularly suitable for checking parts after a first and, respectively, a second machining operation.

16 Claims, 5 Drawing Figures

APPARATUS FOR CHECKING LINEAR DIMENSIONS

BACKGROUND OF THE INVENTION

1. Field of the Invention

The present invention relates to an apparatus for checking dimensions of mechanical parts, comprising a support base, first and second reference rests, for mechanically positioning first and second mechanical parts, measuring units coupled to the support base for checking both the first and the second parts and driving and control units adapted to cause a mutual displacement between the measuring units and the reference rests for achieving a mutual positioning between the measuring units and the first and second parts.

2. Description of the Prior Art

As it is known, the parts that are employed in the mechanical industry, for example in the motor car industry, normally are subjected to subsequent machining operations in the same or, more frequently, in different machine tools.

In particular, with reference to turning machines, although the modern lathes for mass production are very broadly automated and at the same time flexible, due to the use of computer numerical controls, automatic systems for part handling and tool replacement, rotary tools and also, recently, automatic systems for jaw changing, very frequently machining operations are performed, in which a first part is loaded into the chuck of a first lathe—that grips it at an end—is machined by this lathe, then is unloaded and loaded into the chuck or another lathe that grips it at the other end, in order to machine the part in correspondence with the portion previously gripped by the chuck of the first lathe. Of course, while the second lathe machines the first part, the first lathe machines a subsequent part, and so on.

It is also known to use—in view of the trend to reduce the tolerances of the machined parts, to automate the operations consequently diminishing the number of operators or eliminating them, and to shorten the cycle times—measuring apparatuses for automatically checking the dimensions of the machined parts. In particular, known apparatuses are adapted to "post-process" check parts machined in lathes as far as internal or external diameters, thicknesses, longitudinal distances, cylindricity, etc. are concerned.

Usually, these apparatuses are served by the same automatic workhandling systems that serve the lathe (pallet conveyors, robots, gantry loaders, etc).

Since the modern lathes are adapted to machine—depending upon relevant programs loaded into computer numerical controls—parts of different types with very short cycle times and in view of a rising trend towards batch machining, important features of the post-process measuring apparatuses are the flexibility, i.e. the capability of checking different parts without the need of complex operations for retooling of the apparatus, and the quickness, in addition—of course—to high accuracies and repeatabilities of the measurements.

The obtainment of a suitable compromise among these contrasting requirements is not easy and generally involves high costs for the measuring apparatuses. In order to reduce the costs of measuring apparatuses adapted to check parts of different types, it is known to use a common handling system capable of performing a mutual displacement between measuring means and a plurality of parts, positioned by mechanical reference means.

In particular, German Pat. No. 1101777 describes an apparatus in accordance with the preamble of the first claim, comprising a rotary disc—with mechanical reference means for positioning a plurality of parts, of different types, in correspondence with the periphery of the disc—and a plurality of stationary measuring stations. The parts are displaced to relevant measuring stations through step by step rotations of the disc.

This known apparatus is not flexible as far as the measuring means are concerned, because every station is adapted to check a determined type of part. Therefore, this apparatus does not meet the requirements necessary for the abovedescribed applications.

SUMMARY OF THE INVENTION

The object of the present invention is to provide a measuring apparatus that, besides guaranteeing high accuracy and repeatability, is very flexible and fast and has limited cost.

According to the present invention, in the apparatus set forth at the beginning of the disclosure, the first and second reference rests are arranged in positions substantially fixed with respect to the support base and the measuring unit comprise a first slide movable on the support base, at least a second slide movable on the first slide, first sensing unit arranged on the second slide and transducer unit adapted to detect the positions of the first and second slides, the first sensing unit being adapted to be arranged in a position substantially symmetrical with respect to the first and second reference rests.

The invention solves the problem of checking, by using the same measuring unit, parts of different types arranged in different mechanically referenced positions.

Through an apparatus of this type the following results and advantages are achieved: the apparatus is particularly suitable for checking parts undergoing a first and a second operation in two different lathes or on the same lathe (having a single or a double spindle). In the case of machining operations on a pair of lathes, the apparatus can be located according to an arrangement substantially symmetrical with respect to the two lathes, this rendering easier the workhandling operations. The measuring unit may have an arrangement and a location symmetrical with respect to first and second reference rests for relevant parts and this is advantageous for quickly bringing the measuring unit into cooperation with the parts located on the first and second reference rests. These symmetrical arrangement and location permit the use of simple kinematic elements and contribute to the accuracy and repeatability of the apparatus.

BRIEF DESCRIPTION OF THE DRAWINGS

The invention will be now more detailedly described with reference to a preferred embodiment illustrated in the annexed drawings, to be intended however as an example only.

DESCRIPTION OF THE PREFERRED EMBODIMENT

Figure 1:
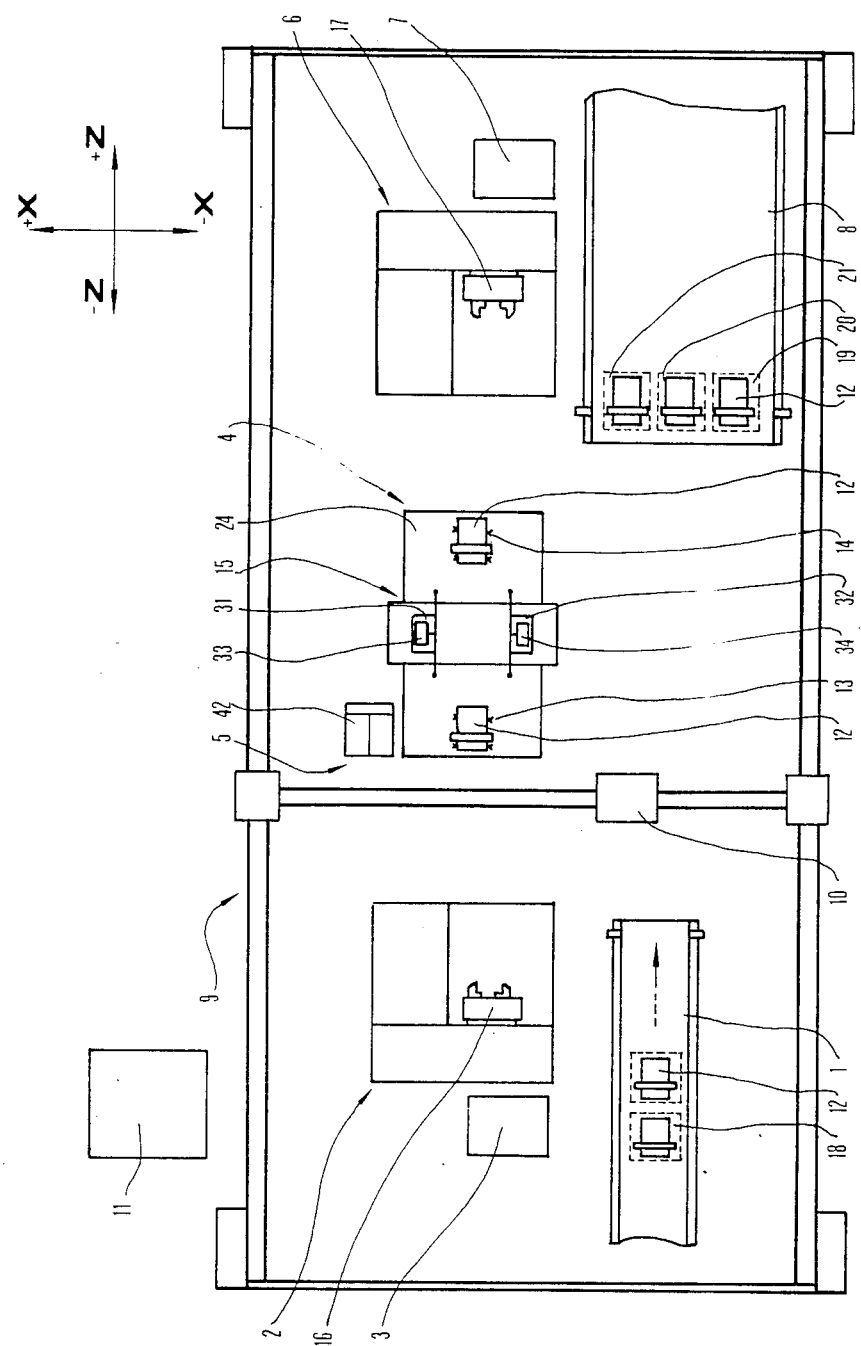
FIG. 1 is a simplified schematic plan view showing a machining and measuring cell including two latches and one measuring apparatus.

The machining and measuring cell schematized in FIG. 1 comprises an input conveyor 1, a first lathe 2 with relevant computer numerical control (CNC) contained within a cabinet 3 also housing a programmable controller, a measuring apparatus 4 controlled by a CNC 42 contained within a cabinet 5, a second lathe 6 with relevant CNC and electric cabinet 7, an output conveyor 8, a gantry loader 9, with a carriage 10 having double gripper, and a central computer 11 that controls the driving members of loader 9 and conveyors 1 and 8, coordinating them with the computer numerical controls housed within cabinets 3, 5, 7.

The cell of FIG. 1 is of a known type, apart from the measuring apparatus 4.

The parts 12 are subsequently advanced by input conveyor 1, with step by step motion, to a pick-up position.

The carriage 10 of gantry loader 9 moves suitably and picks up from conveyor 1, through one of the grippers, not shown, a first part 12, that is loaded onto the spindle 16 of lathe 2, where it is chucked at one end. After machining on lathe 2, carriage 10 picks up the first part 12, loads onto spindle 16, through the other gripper, a second part 12 previously picked up from conveyor 1 and carries the first part 12 onto first reference rests 13 of apparatus 4. CNC 42 controls the displacement of measuring units 15 towards the first part 12, that is checked. If the results of the checkings indicate that this part 12 is good, as far as the previously performed operation is concerned, carriage 10 picks up again the same part 12 and carries it to the second lathe 6. The part 12 is chucked onto spindle 17 of lathe 6 in correspondence with the previously machined end and is machined at the other end.

Then carriage 10 picks up again the first part 12 and carries it onto second reference rests 14 of apparatus 4. CNC 42 controls the displacement of the measuring units 15 in order to perform another checking on the first part 12.

On the basis of the result of the second checking, carriage 10 picks up the part 12 and arranges it in a relevant unloading position onto conveyor 8, depending on whether the part 12 is good, unrecoverable scrap or scrap recoverable through further machining operations.

Figure 2:
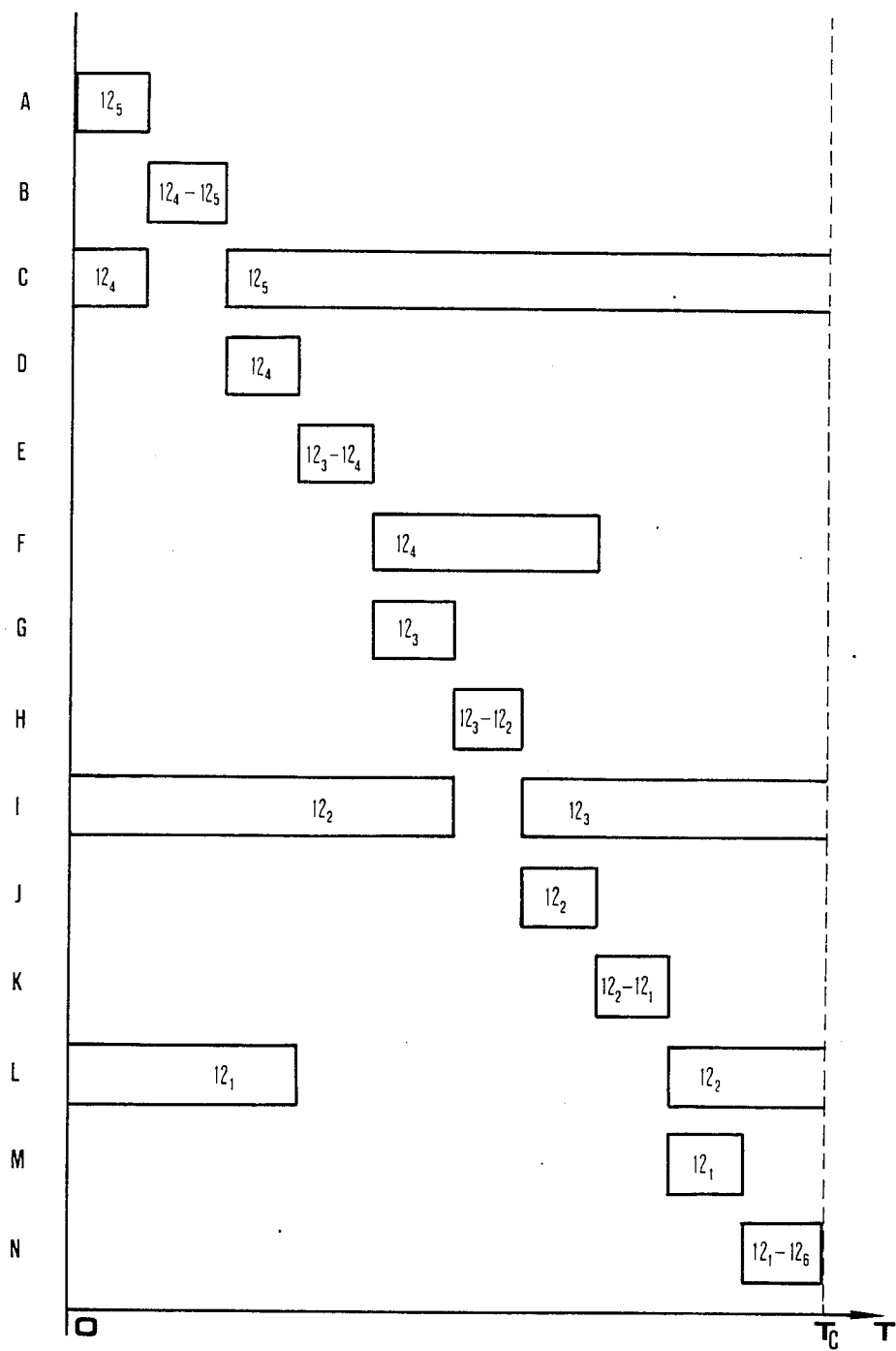
FIG. 2 is an explanatory diagram of the various phases of one operating cycle of the cell of FIG. 1.

The diagram of FIG. 2 shows a possible time chart of the operating phases of the cell of FIG. 1 during a cycle of duration $T_C$.

The abscissas relate to the time T and the ordinates indicate the actual phases for six subsequent parts 12, denoted by $12_1$–$12_6$.

Letters A to N indicate the following phases:

A: transport of a part 12 from conveyor 1 to lathe 2. In the case of FIG. 2 the active phase refers to the transport of part $12_5$;

B: exchange of two parts 12 on lathe 2. In the case of FIG. 2 the active phase refers to the exchange between parts $12_4$ and $12_5$;

C: machining on lathe 2;

D: transport from lathe 2 towards reference rests 13;

E: exchange of two parts 12 onto reference rests 13;

F: measurement of a part 12 on reference rests 13;

G: transport of a part 12 from reference rests 13 to lathe 6;

H: exchange of two parts 12 on lathe 6;

I: machining on lathe 6;

J: transport from lathe 6 to reference rests 14;

K: exchange of two parts 12 on reference rests 14;

L: measurement of a part 12 on reference rests 14;

M: transport of a part 12 from reference rests 14 to conveyor 8;

N: unloading of a part 12 onto conveyor 8 and picking up of a new part 12 from conveyor 1.

The operating cycle of the cell can occur differently from what is shown in FIG. 2. For example, in case the measuring apparatus 4 detects that a part 12 must be considered recoverable or unrecoverable scrap, just after machining on the first lathe 2, this part can be directly unloaded onto output conveyor 8, in a suitable position.

As shown by FIG. 1, the structure of lathes 2 and 6—in particular with respect to the arrangement of the spindles 16, 17—and that of reference rests 13, 14 are such that the parts 12 maintain the same orientation both on lathes 2, 6 and on measuring apparatus 4.

The same applies to conveyor 1, where the parts 12 are located on seats 18, and to conveyor 8, that has seats 19, 20, 21, respectively for good, recoverable and unrecoverable scrap parts 12. This permits simplifying the members and operations for handling parts 12.

The measuring apparatus 4 is now further described with reference to FIG. 3.

The reference rests 13, 14, each defines a V-shaped reference structure for positioning the parts 12 (featuring basically a rotational symmetry) along a transverse direction $\pm X$. Moreover, abutment elements 22, 23 assure axial positioning of the parts 12 ($12_4$ and $12_1$ in FIG. 3), i.e. along a longitudinal direction $\pm Z$.

The reference rests 13, 14, abutments 22, 23 are supported by support base 24 having longitudinal guides 25, 26 enabling sliding of the measuring units 15.

The measuring units 15 of apparatus 4 comprise a first, longitudinal slide 27, coupled to a motor 29 through suitable kinematic members 28, for example with lead screw and split nuts.

Longitudinal slide 27 has a transverse guide 30 along which are movable two transverse slides 31, 32 carrying relevant sensing units constituted by comparative measuring heads 33, 34. The transverse slides 31, 32 are contemporaneously driven by a motor 35, coupled through suitable kinematic members to the same slides. These kinematic members 36—that can comprise, for example, a stem with two threads, one of which is a right-hand and the other a left-hand thread—permit transforming the clockwise and counterclockwise rotary motions of motor 35 into, respectively, mutual approaching and moving away displacements of transverse slides 31, 32.

Slides 31, 32 and measuring heads 33, 34 are always arranged symmetrically with respect to the geometric longitudinal axis of apparatus 4 and/or to the longitudinal symmetry plane defined by the first 13 and second 14 reference rests and containing this geometric axis.

In rest conditions, longitudinal slide 27 and transverse slides 31, 32 are arranged in correspondence with the transverse geometric axis of apparatus 4 and measuring heads 33, 34 have an arrangement substantially symmetrical with respect to the first 13 and second 14 reference rests.

Measuring heads 33, 34 are identical and substantially of known type, therefore are not described in detail. Head 33, for example, comprises a sensing element or movable arm 37 supported by two movable arm-sets, for example of the type featuring resilient parallelograms, so as to be movable substantially along two axes ±Z and ±X, where Z and X are the directions of the longitudinal and transversal geometrical axes of apparatus 4. Elements of head 34 corresponding to those of head 33 are indicated by the same reference numerals, with additional apexes. Of course, movable arm 37' of head 34 is displaceable along ±Z and ±X.

Movable arm 37 has feeling units including two opposite extensions 38, 39 carrying relevant feelers 40, 41 that, in rest position, are symmetrically arranged with respect to the geometrical axis of slide 27, i.e. to the transverse geometrical axis of apparatus 4. Feeler 40 is adapted to touch part $12_4$ arranged on reference rests 13 and feeler 41 is adapted to touch part $12_1$ arranged on reference rests 14.

Heads 33, 34 also comprise position transducers, for example of the differential transformer type, adapted to measure the displacements of movable arms 37, 37' from a rest position.

Housed within cabinet 5, in addition to CNC 42, are input/output circuits 43 and a programmable controller 44.

Figure 4:
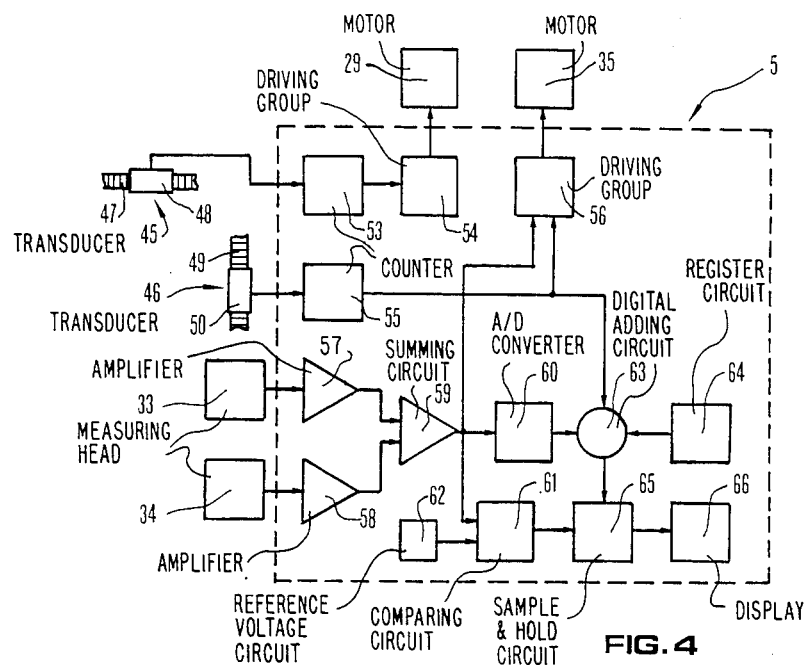
FIG. 4 is a functional block diagram of some circuits of the apparatus of FIG. 3.

Among other things, the input/output circuits 43 are connected, to motors 29 and 35, measuring heads 33, 34 and transducer units constituted by two incremental linear transducers 45, 46 (FIG. 4).

Linear transducer 45, of the optical scale type, is preferably arranged in such a way as to define a geometrical axis coinciding with the longitudinal axis of apparatus 4 and comprises a graduated scale 47 fixed to base 24 and a slide 48 fixed to slide 27.

Linear transducer 46 comprises a graduated scale 49 fixed to slide 31 and a slide 50 fixed to slide 32.

The simplified functional diagram of FIG. 4 schematizes the transducer and measuring units, the driving and control unit and processing unit of apparatus 4. In particular, the diagram of FIG. 4 illustrates the functions of some of the circuits contained within cabinet 5 with reference to the checking of an external diameter.

Linear transducer 45 is connected to a counter 53 that in its turn is connected to a group 54 driving motor 29. Linear transducer 46 is connected, through a counter 55, to a group 56 driving motor 35.

Groups 54 and 56 are controlled depending on the program loaded into numeric control 42.

The output signals of measuring heads 33 and 34 reach, through two amplifiers 57, 58, an analog summing circuit 59. The output of the analog summing circuit 59 is connected to groups 56, to the input of an analog/digital converter 60 and to a comparing or enabling circuit 61 having another input connected to a circuit 62 providing a reference voltage.

A digital adding circuit 63 has three inputs, respectively connected to the outputs of counter 55, converter 60 and of a register circuit 64, and an output connected to a sample and hold circuit 65.

Circuit 65, that has a second input connected to circuit 61, has an output connected to a display unit 66.

The operation of measuring apparatus 4 will now be described, when performing the measurement of an external diameter of part $12_4$ depending on the relevant program loaded into numeric control 42.

Figure 3:
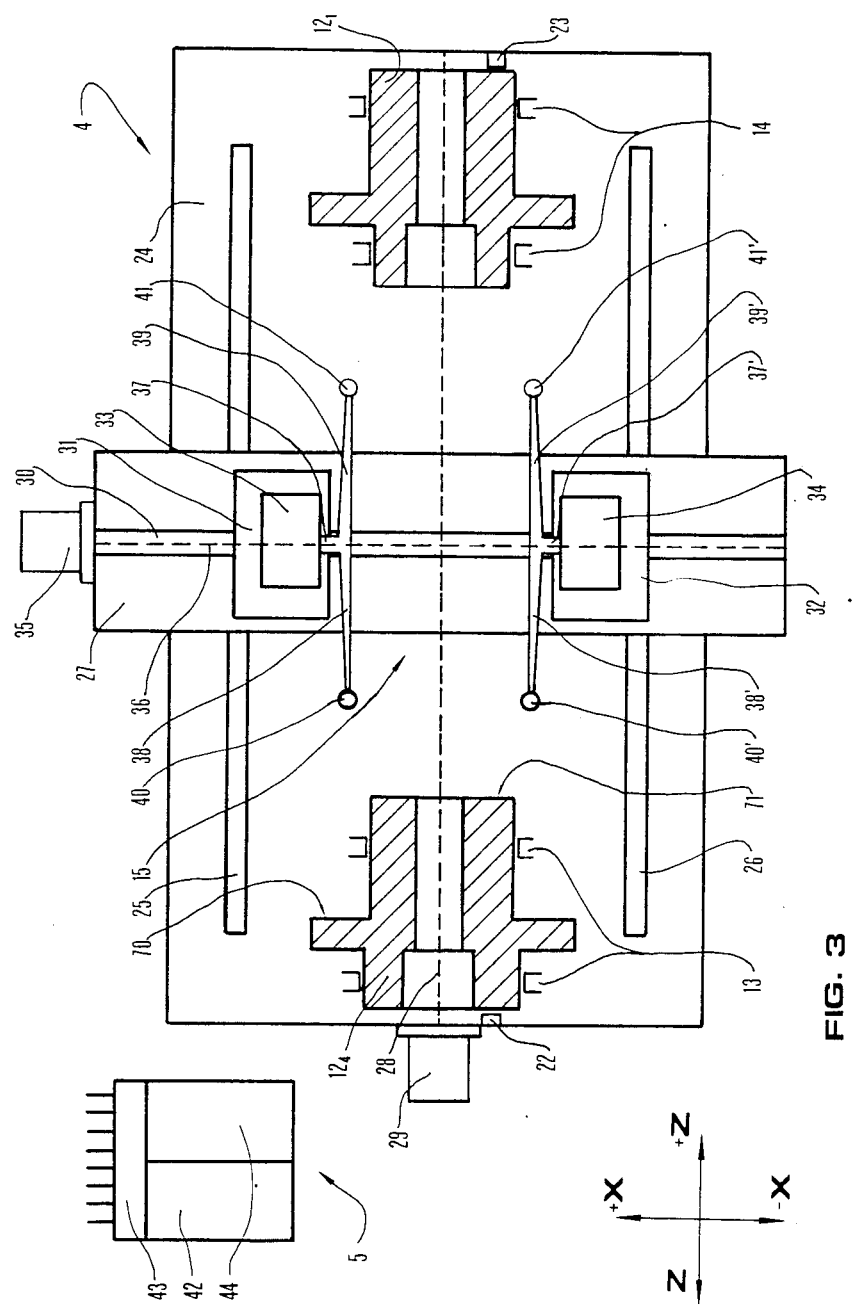
FIG. 3 is a simplified schematic plan view of the measuring apparatus.

In rest position, slide 27 is in the position of FIG. 3, while slides 31 and 32 are in the position of maximum distance (i.e. feelers 40 and 40' are located at the maximum mutual distance they may reach).

Under the control of CNC 42, motor 29 causes slide 27 to translate along direction −Z until feelers 40, 40' are arranged in correspondence with the cross-sections of part $12_4$ the external diameter of which must be checked.

The exact positioning of slide 27 is obtained through linear transducer 45.

Then motor 35 is actuated, depending on the program loaded into numeric control 42, and causes slides 31 and 32 to mutually approach, by displacing them along directions −X and +X, respectively. The mutual position of slides 31 and 32, that are always arranged symmetrically with respect to the longitudinal axis of the apparatus 4 and to the geometrical axis of part $12_4$ (i.e., to the symmetry plane defined by reference means 13), is detected by linear transducer 46. Driving group 56, depending on the value of the output signal of summing circuit 59, controls a speed decreasing and then the stop of motor 35.

During an initial zero-setting operation of apparatus 4 on a master part, in register circuit 64 is memorized a correction value that depends on several parameters, such as the dimensions (the diameter) of feelers 40, 40', their distance in rest conditions and the values of the signals of transducer 46 and measuring heads 33, 34, in rest condition, too.

Therefore, it is evident that when feelers 40, 40' touch part $12_4$ and measuring heads 33, 34 operate in their linear working range, the output signal of digital adding circuit 63 is indicative of the external diameter of part $12_4$.

This measurement signal is detected and memorized by circuit 65, that is enabled by comparator 61.

Finally, the output signal of circuit 65 is displayed by unit 66 and possible recorded by a printer contained in cabinet 5.

If the detected diameter value corresponds to a scrap part $12_4$, CNC 42 transmits to computer 11 a signal for controlling unloading of part $12_4$ onto conveyor 8.

The measurement of external diameters (and similarly that of internal diameters) can occur statically or dynamically (i.e. with stationary or moving slides 31, 32), by combining the signal of transducer 46 with those of heads 33, 34.

Since the measurement of every diameter takes place by using the signals of two measuring heads 33, 34 when both the relevant feelers 40, 40' are into contact with part $12_4$, high speed and accuracy are achieved.

Checking of axial dimensions, too, e.g. of the distance between surfaces 70 and 71 of part $12_4$ is made by using the two heads 33 and 34, the signals of which are combined with the signal of transducer 45.

In this way, it is possible to refer the measured axial distance to the longitudinal axis of apparatus 4, so guaranteeing high accuracy and repeatability.

The circuits for detecting and processing the measurements are not further described since they are not one specific object of the invention and because similar circuits are described in U.S. Pat. No. 4,562,648—Danielli.

According to the present invention, heads 33, 34 and transducers 45, 46 are also used, as previously mentioned, for checking the dimensions of parts, e.g. part $12_1$ of FIG. 3, arranged on reference rests 14 and abutment 23. This involves evident technical and economical advantages.

For parts having particular shapes, the shape of extensions 38, 39 can be different. Moreover, always for parts having particular shape, it can be of advantage to use the variant referred to in FIG. 5.

Figure 5:
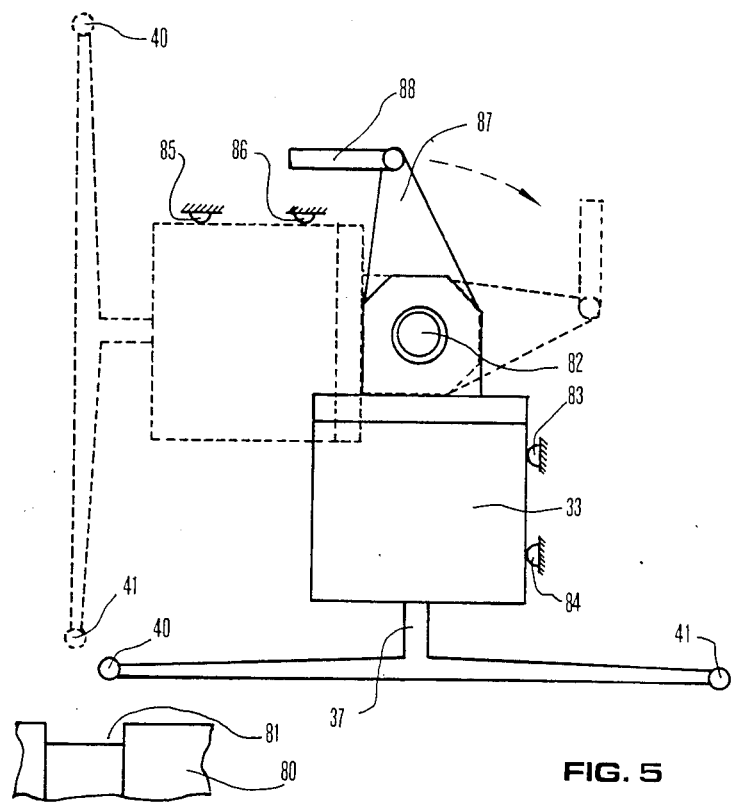
FIG. 5 schematically shows, with enlarged scale, a variant of the apparatus of the preceding figures.

With reference to FIG. 5, if it is desired to check a part 80 having rotational symmetry and featuring a peripheral groove 81, head 33 (and similarly head 34), rather than being rigidly fixed to slide 31, is mounted through coupling means adapted to define at least two positions on head 33. In particular, head 33 is rotatable about an axis or pin 82 fixed to slide 31 and may be arranged in two positions—shown by continuous and dashed lines—defined by abutments 83, 84 and 85, 86 fixed to slide 31. The displacement can be manually or automatically obtained acting on a lever 87 so as to cause a 90° rotation of head 33.

A control element 88 can control the displacement, for example through a double-acting cylinder, and apply a resilient thrust, for example of pneumatic type, for accurately defining the positions of head 33 against abutments 83, 84 or 85, 86.

Reference means 13, 14, 22, 23 can also be made in such a way as to be adjustable or readily replaceable, for permitting the quick retooling of the apparatus 4 to check parts of possibly very different shapes and dimensions.

What is claimed is:

1. An apparatus for checking dimensions of mechanical parts, comprising: support means; first and second reference means arranged in positions substantially fixed with respect to the support means, for mechanically positioning first and second mechanical parts; measuring means coupled to the support means for checking both the first and the second parts, the measuring means including a first slide movable on the support means, a second slide and a third slide, both movable on the first slide, first and second sensing means arranged on the second and third slides respectively and transducer means adapted to detect the positions of the first, second and third slides, the first and second sensing means being adapted to be arranged in positions substantially mutually symmetrical with respect to the first and second reference means; and driving and control means adapted to cause displacements of the measuring means for achieving positioning of the measuring means with respect to the first and second parts.

2. The apparatus according to claim 1, wherein said first and second reference means are adapted to define a longitudinal symmetry plane, said first slide is movable along a longitudinal direction and said second and third slides are movable along a transverse direction.

3. The apparatus according to claim 2, wherein said second and third slides are arranged in symmetrical positions with respect to said longitudinal symmetry plane.

4. The apparatus according to claim 3, wherein said transducer means comprise a first transducer adapted to detect the position of the first slide with respect to the support means and a second transducer adapted to detect the mutual position of the second and third slides.

5. The apparatus according to claim 4, wherein said first and second sensing means comprise two heads, each head having relevant feeling means adapted to touch the first and second parts, the feeling means having an arrangement substantially symmetrical with respect to said longitudinal symmetry plane.

6. The apparatus according to claim 5, wherein the feeling means of each head comprise a movable arm bearing two feelers, one of the feelers being adapted to touch the first parts and the other feeler being adapted to touch the second parts.

7. The apparatus according to claim 1, wherein said driving and control means comprise a first motor for controlling displacements of the first slide and at least a second motor for controlling mutual displacements of the second and third slides.

8. The apparatus according to claim 6, wherein said heads are measuring heads and said movable arm is movable along at least two axes.

9. The apparatus according to claim 2, for checking first parts after a first machining operation and for checking second parts obtained from the first parts through a second machining operation, wherein said first and second reference means are adapted to support the relevant parts with the same orientation with respect to said longitudinal direction.

10. The apparatus according to claim 9, wherein said first and second reference means comprise rests for positioning the parts along said transverse direction and abutments for positioning the parts along said longitudinal direction.

11. The apparatus according to claim 1, wherein said first sensing means are arranged on the second slide through coupling means adapted to define at least two positions of the first sensing means with respect to the second slide.

12. The apparatus according to claim 1, wherein said first and second sensing means are arranged on the second and third slides, so as to be rotatable about relevant axes, the second and third slides defining abutments adapted to define at least two positions of the first and second sensing means.

13. An apparatus for measuring linear dimensions of mechanical parts featuring substantially rotational symmetry, comprising:
   a support base elongated along a longitudinal direction;
   first and second positioning means fixed to the support base for positioning first and second parts, respectively, in longitudinally spaced apart positions;
   a first slide movable on the support base along said longitudinal direction;
   a second slide and a third slide movable on the first slide along a transverse direction;
   first transducer means for providing a signal responsive to the position of the first slide on the support base;
   second transducer means for providing a signal responsive to the mutual position of the second and third slides;
   first and second sensing means arranged respectively on the second and third slides for selectively cooperating with parts arranged on the first and second positioning means and providing relevant signals;
   first motor means coupled to the first slide for moving it along said longitudinal direction and for selectively causing the approach of the first slide towards the first and second positioning means;
   second motor means coupled to the second and third slides for selectively causing mutual approach and moving away displacements of the second and third slides;

whereby dimensions of parts arranged on the first and second positioning means can be selectively measured through displacements of the first, second and third slide to carry the first and second sensing means in cooperation with the part to be measured and through processing of the signals provided by the first and second transducer means with the signals provided by the first and second sensing means.

14. The apparatus according to claim 13, wherein said first and second sensing means respectively comprise a measuring head capable of measuring dimensions along two perpendicular directions.

15. The apparatus according to claim 14, wherein said first and second positioning means define a longitudinal plane of symmetry and said second and third slides and the relevant measuring heads are adapted to be arranged in symmetrical positions with respect to said longitudinal plane of symmetry.

16. The apparatus according to claim 15, wherein said measuring heads have movable arms with feelers adapted to selectively contact the first and second parts, said feelers being adapted to be arranged in positions symmetrical with respect to the first and second positioning means.

* * * * *